United States Patent [19]
Luzzi

[11] Patent Number: 5,570,497
[45] Date of Patent: Nov. 5, 1996

[54] ALTERNATIVE COLD SHRINK DEVICE AND METHOD OF EMPLOYING SAME

[75] Inventor: Glenn J. Luzzi, Mt. Bethel, Pa.

[73] Assignee: Amerace Corporation, Hackettstown, N.J.

[21] Appl. No.: 488,565

[22] Filed: Jun. 8, 1995

Related U.S. Application Data

[62] Division of Ser. No. 313,778, Sep. 29, 1994, Pat. No. 5,467,515.

[51] Int. Cl.[6] ................................. B23P 19/02
[52] U.S. Cl. .................. 29/450; 29/446; 29/868; 29/235
[58] Field of Search .......................... 29/450, 451, 235, 29/283, 868, 426.5, 446; 254/29 A; 174/135, 138 F

[56] References Cited

U.S. PATENT DOCUMENTS

| | | |
|---|---|---|
| 1,669,053 | 5/1928 | Hamel . |
| 3,515,798 | 6/1970 | Sievert . |
| 3,801,067 | 4/1974 | Shorter ................................. 254/29 A |
| 3,824,331 | 7/1974 | Lenhart et al. . |
| 3,946,480 | 3/1976 | Dienes . |
| 4,267,628 | 5/1981 | Israeli . |
| 4,291,454 | 9/1981 | Sawaryn ................................. 29/450 |
| 4,757,588 | 7/1988 | Churchich ............................. 29/235 |

Primary Examiner—Robert C. Watson
Attorney, Agent, or Firm—David Teschner

[57] ABSTRACT

A mandrel having a tapered surface expanding from a first dimension at a first end to a larger dimension at its second, but having a central bore larger than the diameter of a high voltage cable, is forced into the bore of a premolded or extruded high voltage component to expand, at least a portion of such bore to the diameters of such mandrel. A locking device is fixed to the component to retain the mandrel in place. In use the cable is inserted through the mandrel bore into the cover bore and the locking device released. As the cover returns substantially to its former dimensions, the hoops forces applied to the tapered mandrel force the mandrel out from the cover and it may be removed from the cable if desired.

16 Claims, 6 Drawing Sheets

ALTERNATIVE COLD SHRINK DEVICE AND METHOD OF EMPLOYING SAME

This Application is a division of application Ser. No. 08,313,778 filed Sep. 29, 1994 now U.S. Pat. No. 5,467,515.

BACKGROUND OF THE INVENTION

1. Field of the Invention

The invention is directed to the field of cold shrink devices and the method of their use and more particularly to a device to expand a premolded or extruded part, retain it in its expanded condition until placed over an article at which time the device is released and the part as it returns to its original size ejects the device.

2. Description of the Prior Art

Cold shrink methods are used to expand a premolded or extruded part, such as a connector or cable joint, elbow or extruded sleeve, to a size which permits it to be placed over its mating surface (eg. a prepared power cable end) without interference. The device used to expand the product is then removed by the user, allowing the premolded or extruded part to recover substantially to its original dimensions.

One well-known device is that shown in U.S. Pat. No. 3,515,798 issued Jun. 2, 1970, used a removable core to support an elastic cover in its expanded state. The core was removed to permit the elastic cover to regain substantially its original dimensions. Because of the hoop forces exerted upon the core by the elastic cover, it was often difficult, to remove the entire core. If the core's continuous strip broke at any point, it was difficult, if not impossible, to retrieve the strip and continue to remove the core so that the cover could fully recover.

U.S. Pat. No. 3,824,331 issued Jul. 16, 1974, shows a resilient tubular cover being supported in or stretched condition by a removable one piece support member positioned around the outside of the cover. Once the stretched cover is placed over the joint, for example, the inner support member is first removed and then the cover allowed to recover, after which the outer support member can be removed if desired. Any irregularities in the cable or a distorted cable contour can prevent the inner support member being removed and render the device useless.

In U.S. Pat. No. 4,267,628 issued May 19, 1981, an insulator assembly is placed in a device and the air between the walls of the insulator and the device is removed so that the assembly expands into intimate contact with the interior walls of the device. Once in place air is admitted between the insulator and device to permit the stretched insulator assembly to substantially return to its initial dimensions. The procedure is limited to thin wall insulators and can not operate upon the premolded or extruded products used in high voltage systems.

Hamel, U.S. Pat. No. 1,669,053, issued May 8, 1928, shows a cone-shaped rubber sleeve expansion member pushed along rods to expand a rubber sleeve which is placed over a club handle. The grip end is used to push expansion member along the rods to expand the sleeve and then allow the sleeve to remain on the club handle or grip after the expansion member and rods are removed. The method is used at the point of application and has a limited ability to expand the rubber sleeve and would not work with thick rubber sleeves Dines, U.S. Pat. No. 3,946,400 issued Mar. 20, 1976, shows a sleeve expander 10 made of an outermost annulus 22, an intermediate annulus 24 and innermost annulus 26 all joined by support rods or ribs 28. The expanded sleeve (how it is expanded is not disclosed) is placed over a cable 16 and splice 14 which extends through the annuli. The to collapse the sleeve 12, the activating means 34 is pulled causing innermost annulus 26 to move to the right until it engages intermediate annulus 24 and both are pulled to annulus 22 and the three are removed. The ribs 28 remain in place between the sleeve 12, the cable 16 and the splice 14. The annuli are made in two parts so they can be removed from cable 16 when outside the sleeve 12. For short coverings two annuli can be used or their number increased for longer coverings. The presence of the ribs 28 within the completed joint can cause undesired electrical or mechanical problems.

SUMMARY OF THE INVENTION

The instant invention overcomes the complexity and difficulty of prior art cold shrink devices and methods of installation by providing a device which can easily expand a premolded or extruded product and which by its shape is ejected from the receiving product.

A tapered mandrel is inserted into the bore of a premolded or extruded product. The mandrel has a throughbore larger than the largest outer diameter of a prepared high voltage cable. When the product bore is expanded to the desired diameter, an external band or harness is placed on the cable and mandrel to prevent removal of the mandrel. The product in its expanded state is shipped from the factory to the end user. The end user places the product over the end of the prepared cable and removes the band or harness which allows the expanded product to recover substantially its original dimensions due to the elastic memory of the product. In so doing the mandrel is ejected out of the product and can be left on the finished cable joint or removed. The mandrel may be made in two parts to permit easy removal from the cable. The use of lubricants on the cable, the part and the mandrel greatly assists in the functioning of the instant device. It is an object of the invention to provide a device for the cold expansion of a premolded or extruded product which device is ejected from the premolded or extruded product when the expanded product is allowed to return to its original size.

It is a further object of the invention to provide a device for the cold expansion of a premolded or extruded product which device has a tapered body which causes such device to be ejected from the premolded or extruded product when the expanded product is allowed to return to its original size.

It is yet another object of the invention to provide a device for the cold expansion of a premolded or extruded product which device is retained in the expanded product to maintain the product in its expanded state and which device has a tapered body which causes such device to be ejected from the product when the expanded product is allowed to return to its original size.

Other objects and features of the invention will be pointed out in the following descriptions and claims and illustrated in the accompanying drawings, which disclose, by way of example, the principles of the invention, and the best modes presently contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
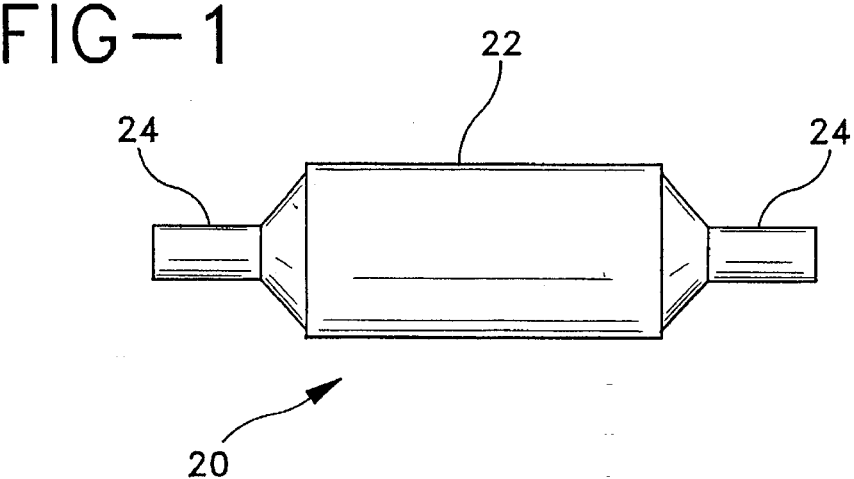
FIG. 1 is a side elevational view of a splice cover for a high voltage cable.
Figure 2:
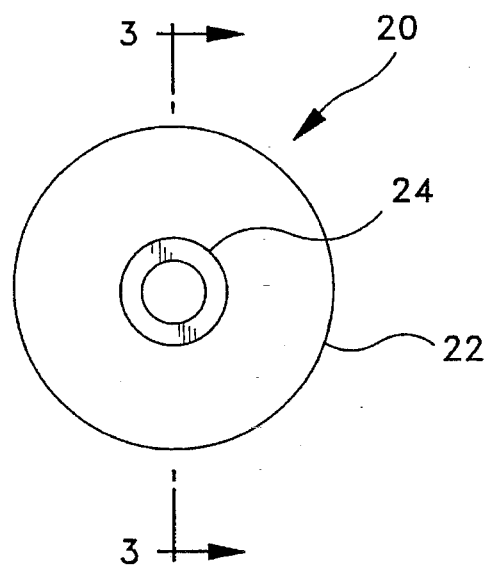
FIG. 2 is an end view of the splice cover of FIG. 1.
Figure 3:
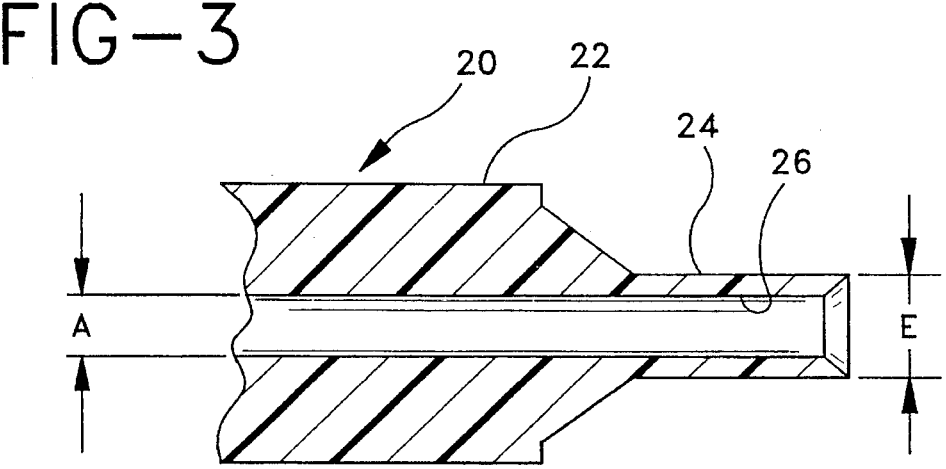

Turning now to FIGS. 1 to 14, there is shown a mandrel 40 and a method for employing such mandrel 40 according to the concepts of the instant invention. FIGS. 1 and 2 show a splice insulation or cover 20 which has a main body 22 and end sections 24. A uniform bore 26 extends through the end sections 24 and the main body 22 as shown in FIG. 3. Within this bore 26 is placed the metallic splice sleeve (not shown) and the high voltage cable coupled to the splice sleeve (not shown).

Figure 4:
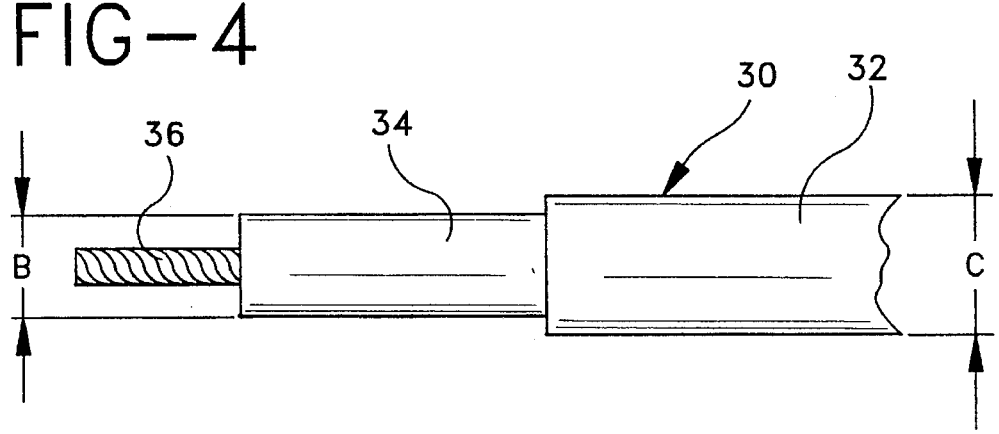
FIG. 4 is a fragmentary side elevation of a prepared high voltage cable end.
Figure 5:
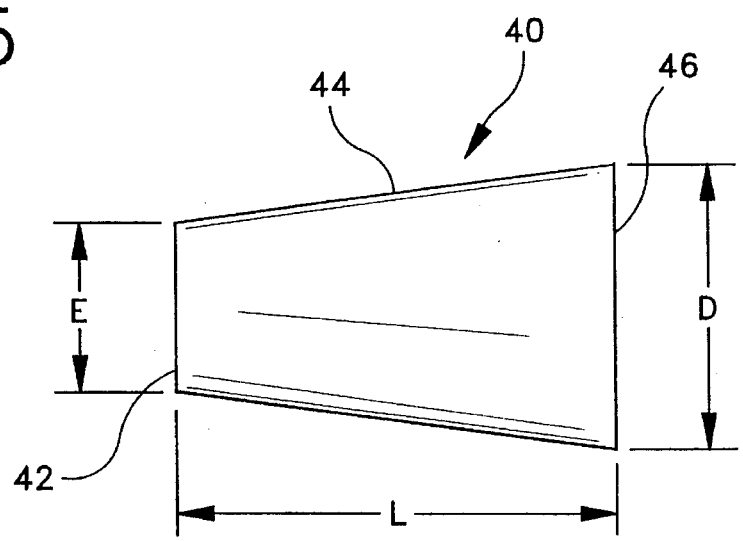
FIG. 5 is a side elevation of a mandrel constructed according to the concepts of the invention.
Figure 6:
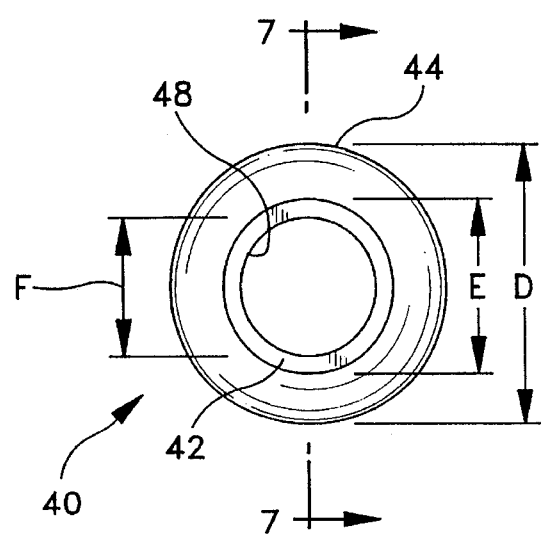
FIG. 6 is an end view of the mandrel of FIG. 5.

FIG. 4 shows a typical high voltage cable 30 having a semi-conductive shield 32, a portion of which has been removed to expose the cable insulation 34 and a portion of the cable insulation 34 has been removed to expose the central conductor 36. The outer diameter of the shield 32 is shown as C in FIG. 4 while the diameter of the insulation layer 34 is B. In the usual case the diameter A of the bore 26, as shown in FIG. 3, is smaller than the diameter B of the cable insulation layer 34. This provides an interference fit between the cable insulation layer 34 and the walls of the cover 20 that define the bore 26 providing the desired electrical performance of the interface. But it is this same interference which makes assembly of the cover 20 to the cable 30 difficult. The resiliency of the cover 20 permits some expansion of the bore 26 and lubricants applied to the cable 30 and bore 26 help in the assembly.

Figure 7:
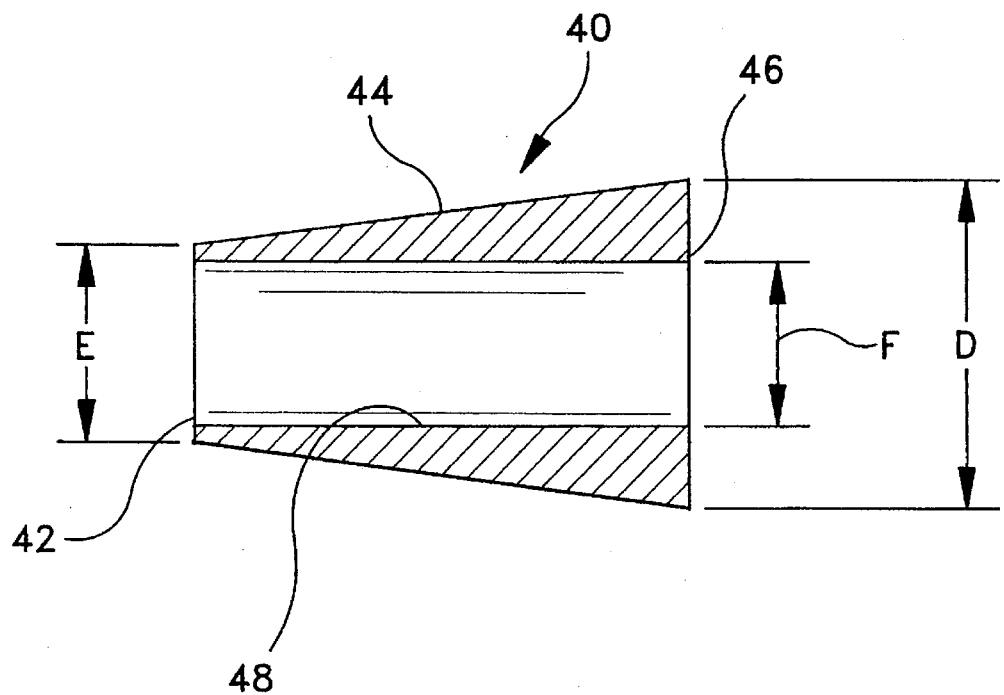
FIG. 7 is a side elevational view, in section, of a first interior construction of the mandrel of FIG. 5.
Figure 8:
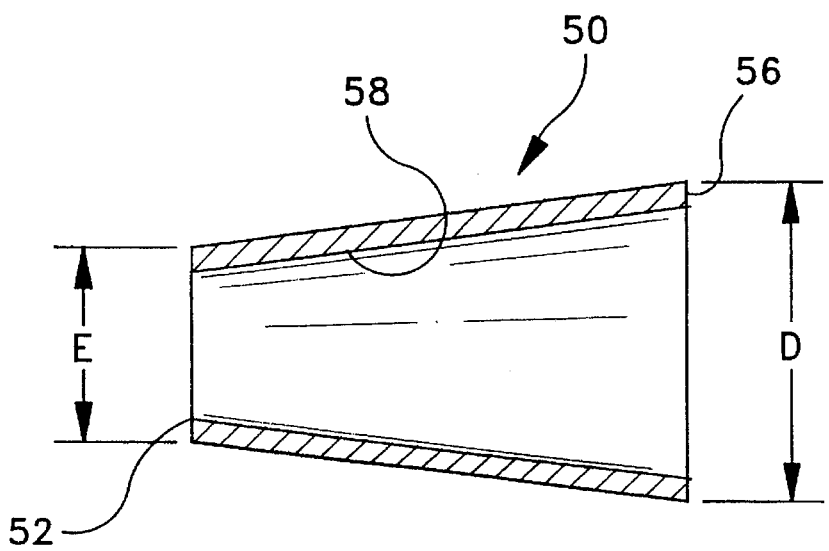
FIG. 8 is a side elevational view in section, of a second interior construction of the mandrel of FIG. 5.

The instant invention provides a mandrel 40 (see FIGS. 5 and 6) having an entry end 42 with an outside diameter E, an upwardly tapered conical outer surface 44 ending in and end 46 having a diameter D. As shown in FIG. 7 a straight-through-bore 48 having a diameter F extends within mandrel 40 from entry end 42 to end 46. The diameter F of the bore 48 is greater than the diameters B of the insulation layer 34 of cable 30 and diameter C of the shield layer 32 of cable 30. Alternatively, a mandrel 50, as shown in FIG. 8 can be used.

Mandrel 50 has tapered bore 58 from entry end 52, which has an outer diameter E as does entry end 42 of mandrel 40, to end 56 which has a diameter D as does end 46 of mandrel 40. The outer surface 56 of mandrel 50 has the same taper as outer surface 46 of mandrel 40. Also, although mandrels 40 and 50 are shown as one piece, the mandrel 60 (see FIG. 14) the mandrel 60 is made of two mating halves 70, 72 which permits separation from the cable after ejection from the cover 20 as will be set forth below. Mandrel 60 has entry end 62, tapered outer surface 64 and end 66. The interior bore (not shown) may be a straight bore as 48 in FIG. 7 or a tapered bore as 58 in FIG. 8.

Figure 9:
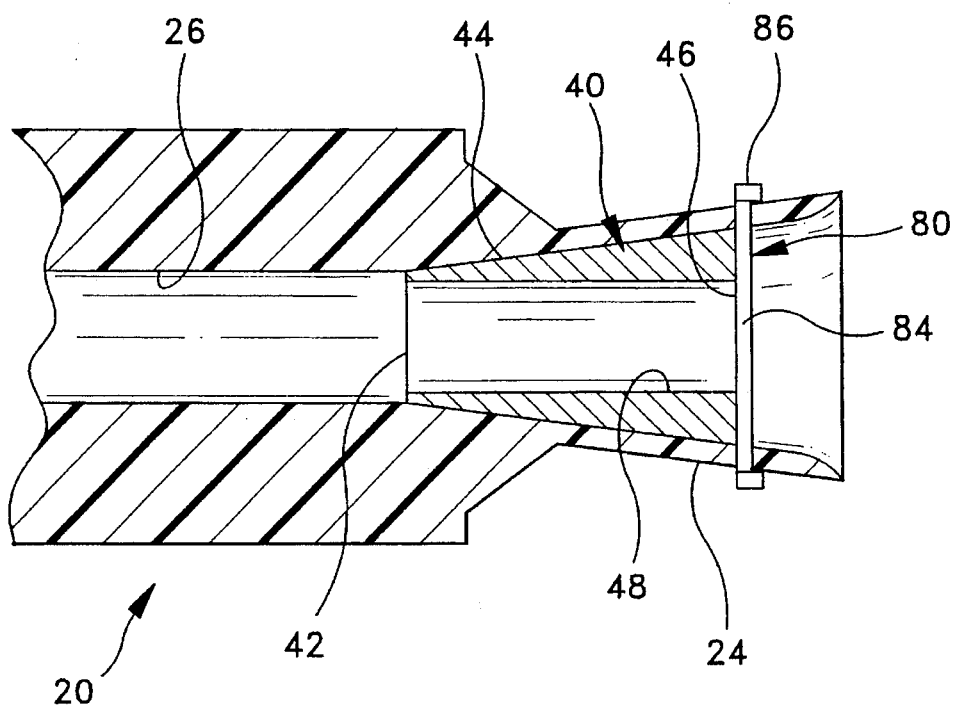
FIG. 9 is a fragmentary side elevation of the mandrel of FIG. 5 inserted into the bore of a splice cover as shown in FIG. 3 and retained in such position.
Figure 10:
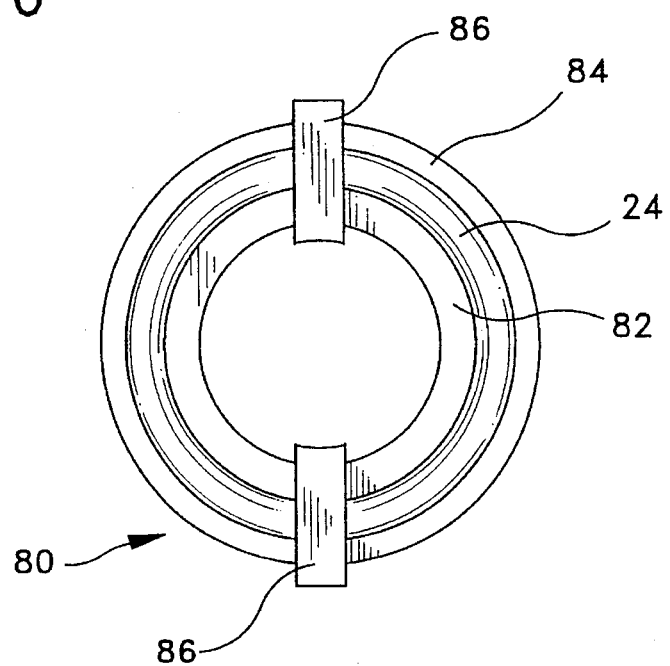
FIG. 10 is an end view of the entrance to the splice cover retained in its expanded state.
Figure 11:
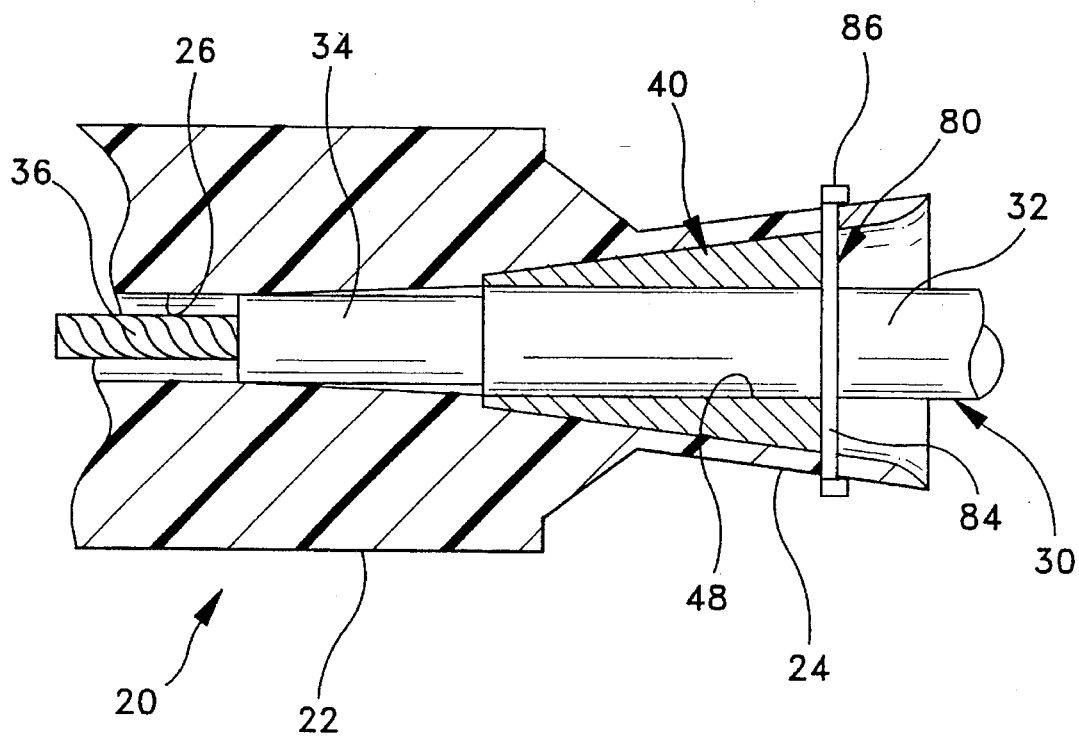
FIG. 11 is a fragmentary side elevation of the expanded cable entrance of the splice cover and mandrel of FIG. 9 with a prepared high voltage cable end as shown in FIG. 4 inserted.
Figure 12:
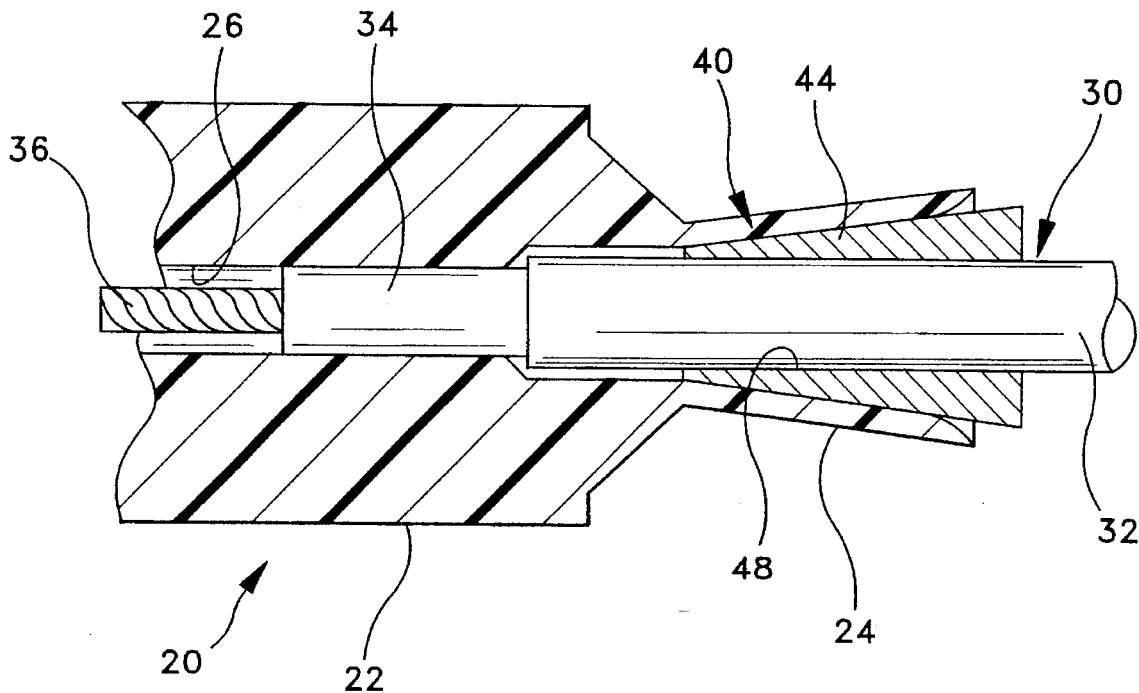
FIG. 12 is the arrangement of FIG. 11 with the retaining means removed and the mandrel being ejected according to the concepts of the invention.

The outer surface 44 of mandrel 40 is lubricated and using factory assembly tools the mandrel 40 is forced into the bore 26 of cover 20 to expand bore 26 from dimension A as shown in FIG. 3 to one which equals diameter E at the entry end 42 of mandrel 40 to one which equals diameter D at the end 46 of mandrel 40 and through at least the length L of mandrel 40 exceeds the diameter F of the bore 48 of mandrel 40. A suitable external band or harness is then applied to retain the mandrel 40 within bore 26 of cover 20. One such arrangement is shown in FIGS. 9 and 10. The device 80 employs an inner band 82 which is placed in the expanded bore 26 in cover end 24 adjacent mandrel end 46. A second band 84 is placed over the cover end 24, also approximately at the location of mandrel end 46. Clamps 86 are connected to bands 82 and 84 to securely grip end 24 between them and prevent their unwanted removal. The other end of the splice cover 20 (not shown) is prepared in the same manner. The splice cover is shipped from the factory in its expanded condition.

To use the splice cover 20, one has merely to prepare his high voltage cable in the manner set forth with respect to FIG. 4. The high voltage cable 30 is inserted through bore 48 of mandrel 40 into bore 26 of cover 20. Once the cable 30 is properly positioned, the device 80 is released by removing clamps 86 and the bands 84 and 82.

Figure 13:
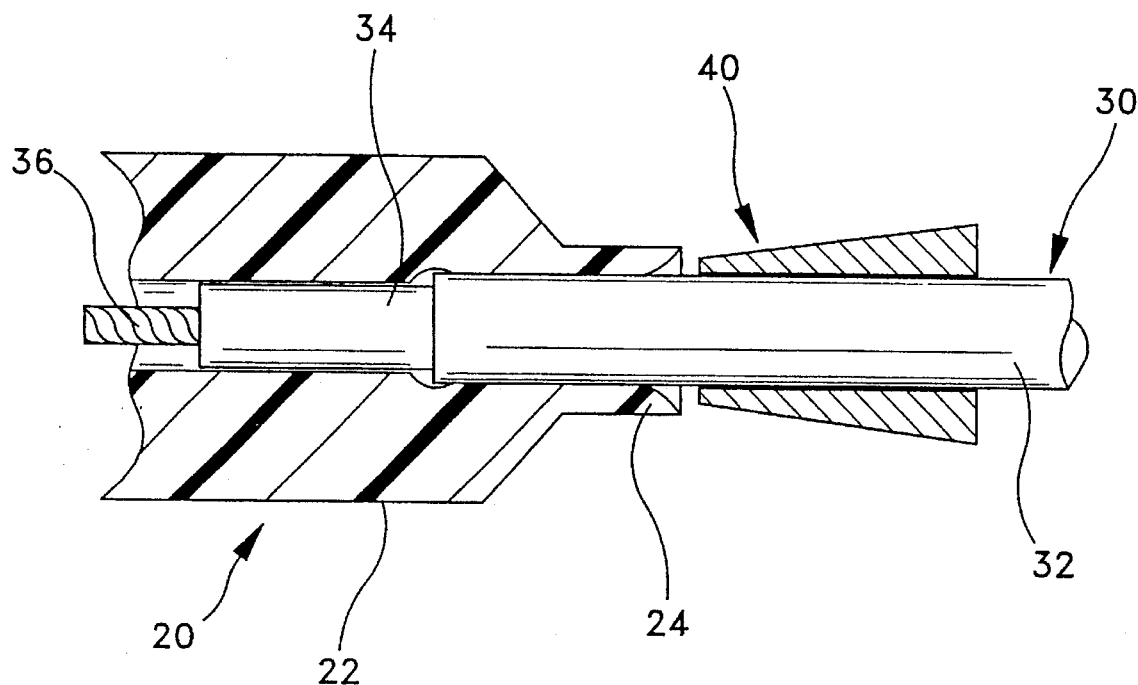
FIG. 13 is the arrangement of FIG. 11 with the mandrel fully ejected.
Figure 14:
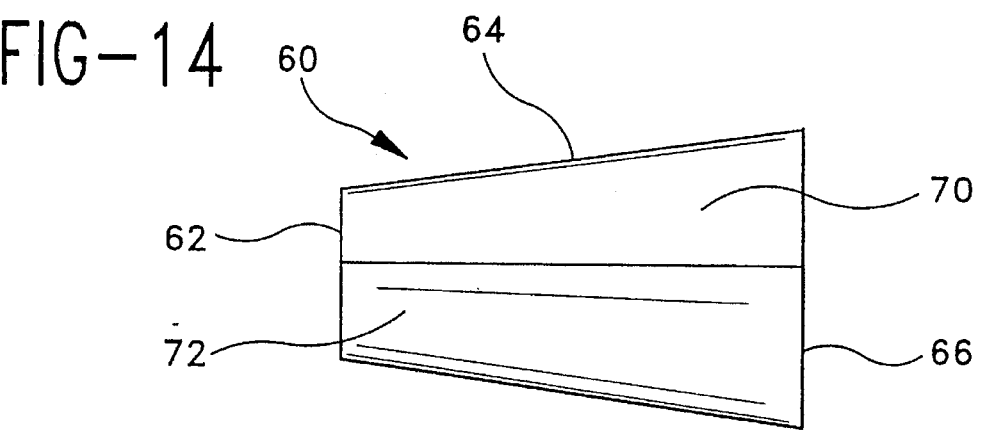
FIG. 14 is a side elevational view of a further construction of the mandrel of FIG. 5.

With cover 20 free of the restraints of device 80, because of its elastic memory, begins to recover towards its original shape and dimensions. As it recovers, the hoop forces applied to mandrel 40 start to extrude mandrel 40 from within ends 24 of cover 20 (see FIG. 12). Because of the taper of surface 44 of mandrel 40 such extrusion of mandrel 40 is greatly assisted. Finally, when the cover has substantially recovered its original shape and size, the mandrel 40 will be fully extruded from the cover 20 as shown in FIG. 13. The mandrel 40 may be left on cable 30 or broken so that it can be totally removed from cable 30. As described above, mandrel 60 is made of two mating parts 70 and 72 which may be removed from cable 30 by separating the halves so that mandrel 60 can be used again. Halves 70, 72 can be locked together during use by external bands or internal locks as is well known in the art. Lubricants can be forced between mandrel surface 44 and bore 26 of the cover 20 to make mandrel removal easier.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. The method of installing a recoverable member having a bore therethrough upon an elongate member comprising the steps of:

a) providing a mandrel means having a first end of a first diameter and a second end of a second diameter larger than said first diameter with a tapered exterior surface between said first end and said second end and a bore therethrough from said first end to said second end;

b) forcing said mandrel into the bore of said recoverable member to expand at least a portion of the bore of said recoverable member;

c) fixing said mandrel in place so that it can not be removed from said expanded bore of said recoverable member;

d) inserting an elongate member through said bore in said mandrel into at least said expanded bore of said recoverable member; and e) releasing said mandrel causing said recoverable member to attempt to recover its initial dimensions and expelling said mandrel from said recoverable member along said elongate member.

2. The method of claim 1 including the further step of removing said mandrel from said elongate member.

3. The method of claim 2, wherein the step of removing said mandrel from said elongate member is carried out by breaking the mandrel.

4. The method of claim 2, wherein said mandrel is comprised of two halves; each extending along the longitudinal axis of said mandrel and the step of removing said mandrel from said elongate member is carried out by separating the two halves of said mandrel.

5. The method of claim 1, including the step of lubricating said mandrel before the step of forcing said mandrel into the bore of said recoverable member.

6. The method of installing a recoverable elongate member having a bore therethrough upon a member comprising the steps of:

a) providing a mandrel means having a first end of a first diameter and a second end of a second diameter larger than said first diameter with a tapered exterior surface between said first end and said second end and a bore therethrough from said first end to said second end;

b) forcing said mandrel into the bore of said recoverable member to expand at least a portion of the bore of said recoverable member;

c) fixing said mandrel in place so that it can not be removed from said expanded bore of said recoverable member;

d) inserting an elongated member through said bore in said mandrel into at least said expanded bore of said recoverable member; and e) releasing said mandrel causing said recoverable member to attempt to recover its initial dimensions and expelling said mandrel from said recoverable member along said elongated member.

7. The method of claim 6 including the further step of removing said mandrel from said elongate member.

8. The method of claim 7, wherein the step of removing said mandrel from said elongate member is carried out by breaking the mandrel.

9. The method of claim 7, wherein said mandrel is comprised of two halves, each extending along the longitudinal axis of said mandrel and the step of removing said mandrel from said elongate member is carried out by separating the two halves of said mandrel.

10. The method of claim 6, including the step of lubricating said mandrel before the step of forcing said mandrel into the bore of said recoverable member.

11. The method of installing a recoverable electrical insulating device having a bore therein on the insulation and shield layers of a prepared electrical cable having a portion of its shield layer removed to expose the insulation layer of said cable inserted into said bore comprising the steps of:

a) providing a mandrel means having a first end of a first diameter and a second end of a second diameter larger than said first diameter with a tapered exterior surface between said first end and said second end and a bore therethrough from said first end to said second end;

b) forcing said mandrel into the bore of said electrical insulating device to expand at least a portion of the bore of said insulating device;

c) fixing said mandrel in place so that it can not be removed from said expanded bore of said expanded bore of said recoverable member;

d) inserting a prepared electrical cable through said bore of said mandrel into said bore of said insulating device so that the exposed insulation layer and a portion of said shield layer adjacent said insulating layer are within said expanded bore of said insulating device; and e) releasing said mandrel causing said recoverable electrical insulating device to attempt to recover its initial dimensions and expelling said mandrel from said insulating device along said shield of said cable.

12. The method of claim 11, including the further step of:

a) advancing said electrical cable through said bore of said mandrel and the bore of said insulating device until said device is beyond the end of said electrical cable and over said shield layer;

b) preparing said cable by removing a portion of the shield layer and a portion of said insulation layer; and c) returning said mandrel and said insulating device over said exposed insulation layer and a portion of said shield layer.

13. The method of claim 11, including the further step of removing said mandrel from said cable.

14. The method of claim 13, wherein the step of removing said mandrel from said electrical cable is carried out by breaking the mandrel.

15. The method of claim 13, wherein said mandrel is comprised of two halves, each extending along the longitudinal axis of said mandrel and the step of removing said mandrel from said electrical cable is carried out by separating the two halves of said mandrel.

16. The method of claim 11, including the step of lubricating said mandrel before the step of forcing said mandrel into the bore of said electrical insulating device.

* * * * *